May 24, 1932. A. M. BOEVER 1,859,614
HANDLE FOR COFFEE MAKERS AND THE LIKE
Filed April 24, 1929
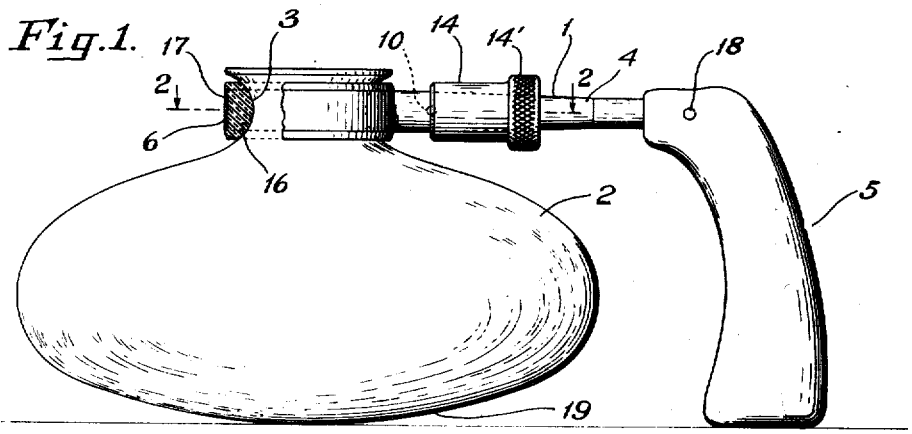
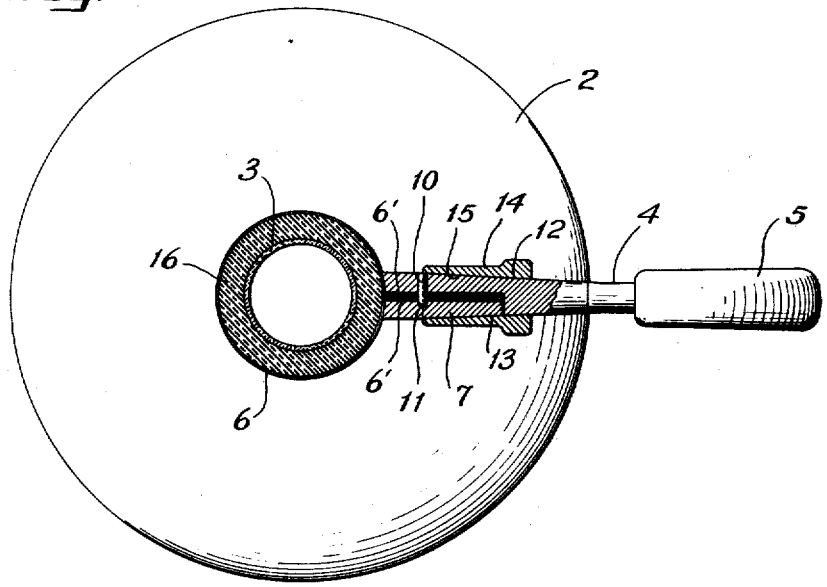
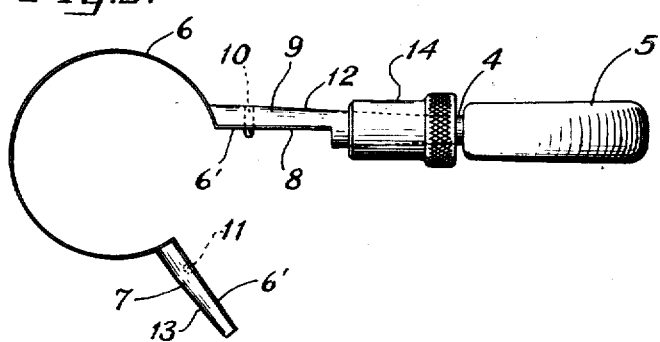
INVENTOR
ANNE M. BOEVER
BY
ATTORNEY.

Patented May 24, 1932

1,859,614

UNITED STATES PATENT OFFICE

ANNE M. BOEVER, OF HARTFORD, CONNECTICUT, ASSIGNOR TO THE SILEX COMPANY, A CORPORATION OF CONNECTICUT

HANDLE FOR COFFEE MAKERS AND THE LIKE

Application filed April 24, 1929. Serial No. 357,835.

My invention relates to handles for coffee makers and the like.

It has for its object to provide an improved handle, and more particularly an improved handle especially adapted to use in connection with receptacles such as coffee makers or the like. Further objects of my invention include the provision of a handle of improved and simplified construction and one especially adapted to be readily attached to or removed from a receptacle and especially adapted to use in connection with the lower bowl of a coffee maker, and also adapted to cooperate with the receptacle, and particularly with such a bowl having a rounded bottom, to prevent tilting of the receptacle. These and other objects and advantages of my improved construction will, however, hereinafter more fully appear.

In the accompanying drawings I have shown, for purposes of illustration, one embodiment which my invention may assume in practice.

In these drawings,—

Figure 1 is a side elevation of the lower bowl of a coffee maker equipped with my improvement, the view being partially in section to facilitate illustration;

Fig. 2 is a transverse sectional view on line 2—2 of Fig. 1, and

Fig. 3 is a plan view of the handle showing the same in open position.

In this illustrative construction, I have shown a handle, generally indicated at 1, associated with the lower or pouring bowl 2 of a coffee maker, not shown, the handle being of an improved construction and connected to the neck 3 of that bowl through improved connecting means, all as hereinafter more particularly described.

Referring to the handle 1, it will be noted that it includes a horizontal body portion 4 having a suitable grip portion, herein in the form of a depending portion 5. This body portion herein has a neck engaging portion or loop 6, preferably suitably united integrally with one end thereof and adapted to fit the neck of the maker bowl when connected as shown in Figs. 1 and 2. As shown herein, this loop 6 is also preferably formed of thin metal to increase radiation and minimize heating of the handle, and also of spring material so that it is adapted whenever released to occupy the position shown in Fig. 3.

This metal spring 6 herein has extensions 6' on its ends. Of these the one on its free end is suitably united, as by brazing, with a cooperating outer terminal member 7. The other is similarly united to the inner wall of a longitudinal aperture 8 on a portion 9 of the member 4. This aperture 8 is also adapted to receive the other extension 6' and the member 7 as shown in Fig. 2, the two ends 6' then being adjacent. Moreover, it will be noted that herein the members 7 and 9 are correspondingly shaped externally so that when brought together they unite to form a symmetrical extension of the member 4. It will also be noted that a pin or projection 10 is provided on the side of the portion 9 toward the portion 7, which is extended through the portion 9 and its spring end 6' and adapted to be received in a corresponding aperture 11 in the adjacent side of the other spring end 6' and member 7. In the structure illustrated herein, both the members 7 and 9 are also provided with sloping, herein conical, outer surfaces 12, 13, which cooperate to form an exterior of greater diameter toward the ends of the same to which the spring 6 is connected. Thus, it will be observed that herein when the members 7 and 9 are brought together they unite to form a conical member.

Cooperating with the conical member thus formed is a reciprocable and rotatable holding member or ring 14 carried on the member 4. This member 14 herein has a conical internal surface 15 and also a knurled flanged end 14' on the exterior of its end toward the portion 5. Thus, the member 14 is adapted to be readily moved by the hand grasping the portion 5 to engage or disengage the cooperating surfaces 12 and 13 on the members 7 and 9. When the portions 7 and 9 are held together and the retracted member 14 is pushed toward the spring, it will force the member 7 into engagement with the member 9 as shown in Figs. 1 and 2 and hold it in that position and especially tightly when rotated. These members will, of course, also be released so that the spring 6 may assume the position shown in Fig. 3 whenever the member 14 is moved into the position shown therein.

In practice, and especially when the handle is used on the glass pouring bowl of a coffee maker, an insulating ring or washer 16, usually of soft rubber, is also carried on the neck 3 of the bowl 2. Herein, this member 16 is also provided with an annular groove 17 in its external surface adapted to receive the spring 6 on the handle and accordingly permit the same when compressed not only to hold firmly but to merge substantially into the washer and present a very neat appearance. By using such a soft rubber member, all objectionable contact of metal with the glass bowl is eliminated, while by using a soft rubber member it is also made possible to take care of various variations in size, as for example of the bowl necks.

Herein it will also be noted that the handle is provided with a grip portion fastened to the body 4 of the handle by a transverse pin 18 and providing a depending portion adapted to be grasped in the fingers and an upper thumb support conveniently adjacent the member 14. It will also be noted that the depending portion acts as a means for limiting the tilting of the bowl which would otherwise occur due to the laterally disposed weight of the handle, this being especially desirable when, as herein, the bowl is provided with a protruding or conical bottom 19. While it will be evident that I may use various lengths of depending portion permitting only an unnoticeable tilting, it will be noted that herein the grip portion 5 is of such length as to engage any plane support on which the bottom 19 rests and hold the bowl in upright position without any tilting whatever.

In the use of my improvement, the handle may be readily attached to or removed from the bowl neck by opposite movements of the member 14 on the handle body 4. When it is desired to attach the handle to the bowl, it is only necessary to place the spring around the neck 3, bring the member 7 into the position illustrated in Fig. 2, and then slide the member 14 to the position illustrated in that figure, whereupon the handle spring firmly grips the ring 16. Here it will be noted that due to the connecting means used, the handle is adapted to produce such a tight grip despite slight variations in the size of the neck or ring 16. Attention is also directed to the fact that due to the heat insulating member 16 and the provision of the spring 6, the radiation from which is large, the heat transmitted from the bowl to the member 4 is small, thereby enabling the handle to be used with comfort even when the bowl is hot, as for example, when coffee is made on the table and immediately poured. It will also be noted that through the use of the improved handle it is possible for the operator to use the bowl conveniently and surely with a minimum of danger of spilling due to twisting of the handle in the hand, the depending portion being so located as to space the knuckles from the receptacle and be adapted to be gripped in the fingers, while a thumb support is provided at the top thereof adjacent the member 14 so that the latter may be readily operated by reverse movements of the thumb. It will also be noted that through extending the depending handle down into contact or substantially into contact with the support, any objectionable tendency of the rounded bottomed bowl to tilt is overcome, the weight of the handle being thus supported on the table rather than tending objectionably to overbalance the bowl. These and other advantages of my improved construction will, however, be evident to those skilled in the art.

The illustrative construction shown may be modified in various respects without departing from the spirit of my invention, and it will be understood that it is my intention to include all such modifications in the scope of the appended claims.

What I claim as new and desire to secure by Letters Patent is:—

1. An article transporting handle having a flexible article grasping loop, and means for forming a rigid unit of said handle and loop.

2. An article transporting handle having a resilient loop thereon forming a resilient article grasping portion, and means for forming a rigid unit of said handle and loop.

3. An article transporting handle having a resilient article grasping loop rigidly connected thereto and provided with a releasable end, and means for attaching said end thereof to the handle forming a rigid unit of said handle and loop.

4. An article transporting handle comprising a body, a resilient article grasping loop member having normally spaced ends, and means for connecting said ends and body into a rigid unit.

5. An article transporting handle comprising a body, a resilient article grasping loop member connected thereto at one end and having a normally open resilient end, and a holding member for the latter on said body receiving said resilient end and pressed laterally by the latter.

6. A handle comprising a body, a loop member connected thereto at one end and having a free end, a holding member for the latter reciprocable on the body, and wedging means inside said holding member.

7. A handle comprising a body, a loop member having one end rigidly connected thereto and a resilient end adapted to be compressed when pressed toward said body, and reciprocable holding means for said resilient end carried on said body and pressed laterally by said resilient end.

8. A handle comprising a body portion, a normally open spring having one end connected to said body and a free end portion, a reciprocable holding member on said body, and cooperating wedging means on the exterior of one of said portions and on the interior of said reciprocable member.

9. An article transporting handle comprising a body portion, a normally open article grasping spring having projecting ends, one rigidly connected to said body portion, and means for connecting the other end to said body portion forming a rigid unit of said body portion and spring.

10. An article transporting handle comprising a body portion, a normally open article grasping spring having projecting ends, one disposed in an aperture in said body portion and rigidly connected to the latter and the other engageable with said first mentioned end, and releasable means holding said ends together and forming a rigid unit of said body portion and spring.

11. An article transporting handle comprising a body portion having an aperture therein, a normally open article grasping member having one end rigidly connected to said body and carrying on its opposite end a member receivable in said aperture, and holding means for said free end forming a rigid unit of said body portion and normally open member.

12. An article transporting handle comprising a body portion, a normally open article grasping spring having projecting ends, one disposed in an aperture in said body portion and rigidly connected to the latter and the other engageable with said first mentioned end and carrying a terminal member on its opposite side, and a holding member movable lengthwise of said projecting ends.

13. An article transporting handle comprising a body portion, a normally open article grasping spring having projecting ends, one disposed in an aperture in said body portion and rigidly connected to the latter and the other engageable with said first mentioned end and carrying a terminal member on its opposite side, a pin projecting through one of said ends and extending into the other, and a holding member movable lengthwise of said projecting ends.

14. A handle comprising a body portion having an aperture therein, a normally open member having one end connected to said body and carrying on its opposite end a member receivable in said aperture, a reciprocable end holding member on said body having wedging means inside said member.

15. A handle comprising a body portion having an aperture therein, a normally open spring having one end connected to said body and carrying on its opposite end a member receivable in said aperture, said aperture and said portion having interengaging projection and aperture means thereon, and a reciprocable holding member on said body having wedging means inside the same.

16. A handle comprising a body portion having an aperture therein, a normally open spring having one end connected to said body and carrying on its opposite end a member receivable in said aperture, a reciprocable holding member on said body, and cooperating wedging means on the exterior of said portion and on the interior of said reciprocable member.

17. An article transporting handle comprising a body portion, receptacle clamping means on one end thereof including a resilient normally open loop and a member reciprocable longitudinally of said body portion between its ends and over the free end of said loop, and a grip portion on the opposite end of said body from said clamping means.

18. An article transporting handle comprising a body portion, receptacle clamping means on one end thereof including a resilient normally open loop and a member reciprocable longitudinally of said body portion, and a grip portion and over the free end of said loop on the opposite end of said body from said clamping means having a depending portion laterally spaced from said loop and adapted to be grasped by the fingers and a top surface forming a thumb support adjacent said reciprocable member.

19. In combination, a receptacle having a bottom adapted to permit tilting of the receptacle when resting on a plane support, and a handle carried on said receptacle normally overbalancing the same and having means engageable with said support and cooperating with said bottom in positioning said receptacle on said support.

20. In combination, a receptacle, and a handle carried on said receptacle having a depending support engaging portion extending downward into adjacency to the plane of a support for said receptacle and having its support engaging end substantially spaced laterally relative to the lowermost portion of said receptacle.

21. In combination, a receptacle having a convex bottom adapted to permit tilting of the receptacle when resting on a plane support, and a handle carried on said receptacle and having means depending therefrom and terminating substantially in the plane of said support at a laterally spaced point from said bottom and cooperating with said bottom in positioning said receptacle in upright position.

22. In combination, a bowl having a neck, a soft rubber washer carried by said neck, and a handle for said bowl having a bowl supporting loop encircling said washer and maintained thereby out of contact with said bowl.

23. In combination, a bowl having a neck, a soft rubber washer carried by said neck, and a handle for said bowl having a bowl supporting loop encircling said washer and maintained thereby out of contact with said bowl, said washer also having a groove in its outer face receiving said loop.

24. In combination, a bowl having a neck, a washer carried by said neck, and a handle for said bowl having a light flexible bowl supporting loop rigidly and releasably connected to said handle and grasping said washer and insulated thereby from the bowl neck.

25. In combination, a bowl having a neck, an annularly grooved washer carried by said neck, a handle, a resilient bowl supporting loop grasping the grooved portion of said washer and insulated thereby from the bowl neck, and means for connecting said handle and loop into a vertically rigid unit releasable at will to permit separation of said loop from said washer.

In testimony whereof I affix my signature.

ANNE M. BOEVER.

CERTIFICATE OF CORRECTION.

Patent No. 1,859,614.   May 24, 1932.

ANNE M. BOEVER.

It is hereby certified that error appears in the printed specification of the above numbered patent requiring correction as follows: Page 3, lines 95 and 96, claim 18, strike out the words "and over the free end of said loop" and insert the same to follow "portion" in line 94; and that the said Letters Patent should be read with this correction therein that the same may conform to the record of the case in the Patent Office.

Signed and sealed this 18th day of October, A. D. 1932.

M. J. Moore,
Acting Commissioner of Patents.

(Seal)

supporting loop encircling said washer and maintained thereby out of contact with said bowl.

23. In combination, a bowl having a neck, a soft rubber washer carried by said neck, and a handle for said bowl having a bowl supporting loop encircling said washer and maintained thereby out of contact with said bowl, said washer also having a groove in its outer face receiving said loop.

24. In combination, a bowl having a neck, a washer carried by said neck, and a handle for said bowl having a light flexible bowl supporting loop rigidly and releasably connected to said handle and grasping said washer and insulated thereby from the bowl neck.

25. In combination, a bowl having a neck, an annularly grooved washer carried by said neck, a handle, a resilient bowl supporting loop grasping the grooved portion of said washer and insulated thereby from the bowl neck, and means for connecting said handle and loop into a vertically rigid unit releasable at will to permit separation of said loop from said washer.

In testimony whereof I affix my signature.

ANNE M. BOEVER.

CERTIFICATE OF CORRECTION.

Patent No. 1,859,614.    May 24, 1932.

ANNE M. BOEVER.

It is hereby certified that error appears in the printed specification of the above numbered patent requiring correction as follows: Page 3, lines 95 and 96, claim 18, strike out the words "and over the free end of said loop" and insert the same to follow "portion" in line 94; and that the said Letters Patent should be read with this correction therein that the same may conform to the record of the case in the Patent Office.

Signed and sealed this 18th day of October, A. D. 1932.

M. J. Moore,
Acting Commissioner of Patents.

(Seal)

CERTIFICATE OF CORRECTION.

Patent No. 1,859,614.  May 24, 1932.

ANNE M. BOEVER.

It is hereby certified that error appears in the printed specification of the above numbered patent requiring correction as follows: Page 3, lines 95 and 96, claim 18, strike out the words "and over the free end of said loop" and insert the same to follow "portion" in line 94; and that the said Letters Patent should be read with this correction therein that the same may conform to the record of the case in the Patent Office.

Signed and sealed this 18th day of October, A. D. 1932.

(Seal)

M. J. Moore,
Acting Commissioner of Patents.